May 7, 1957 S. LEVITT 2,791,463
PLASTIC LINERS AND PLASTIC CEILING LINER FOR TRAILERS
Filed Nov. 30, 1953 2 Sheets-Sheet 1
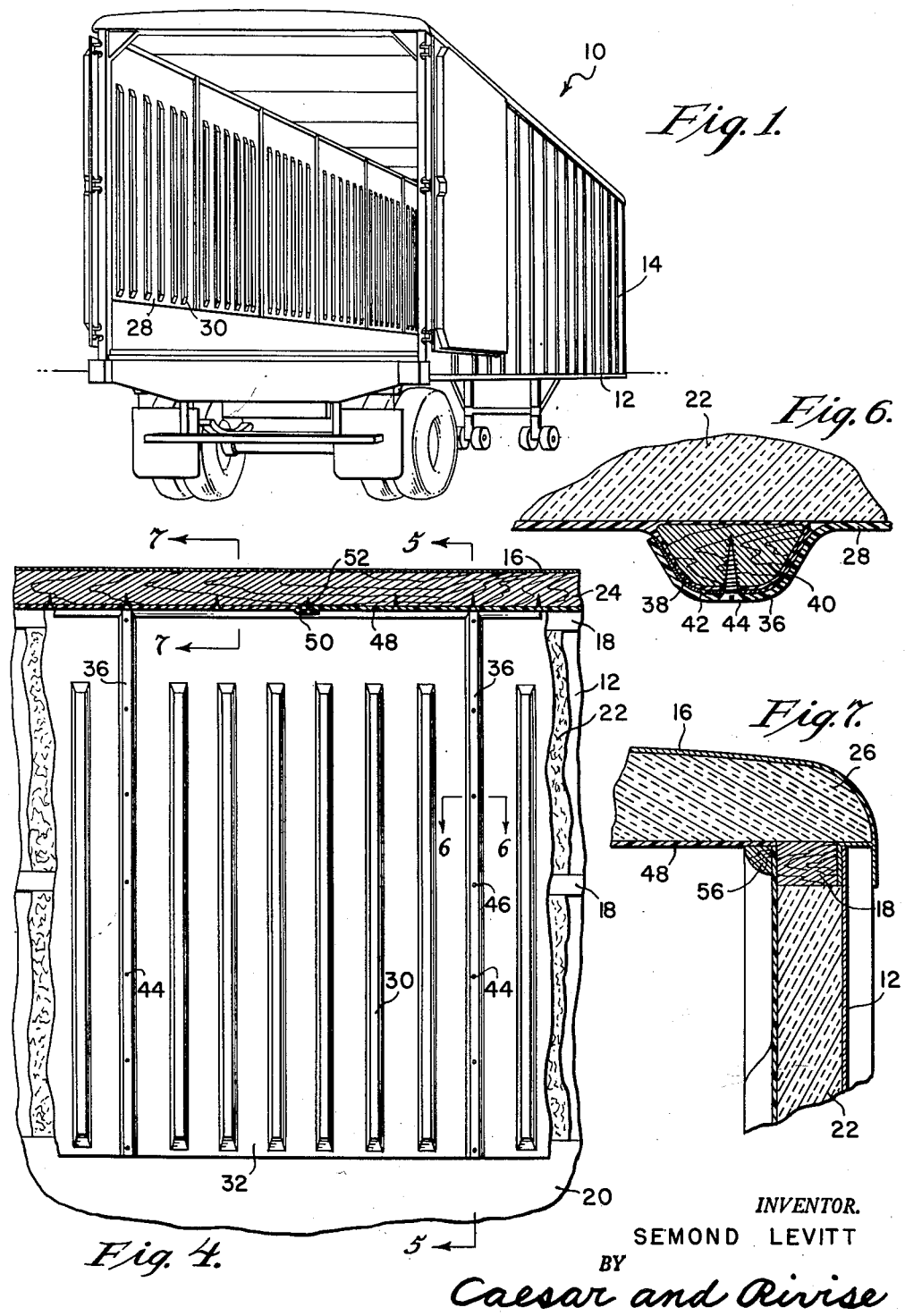
INVENTOR.
SEMOND LEVITT
BY
Caesar and Rivise
ATTORNEYS.

May 7, 1957 S. LEVITT 2,791,463
PLASTIC LINERS AND PLASTIC CEILING LINER FOR TRAILERS
Filed Nov. 30, 1953 2 Sheets-Sheet 2
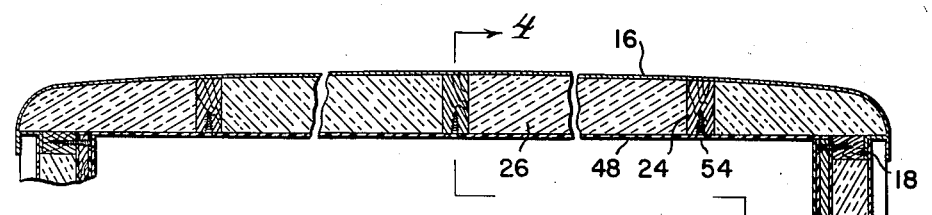
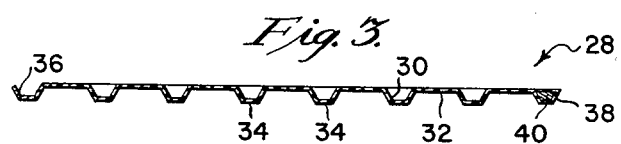
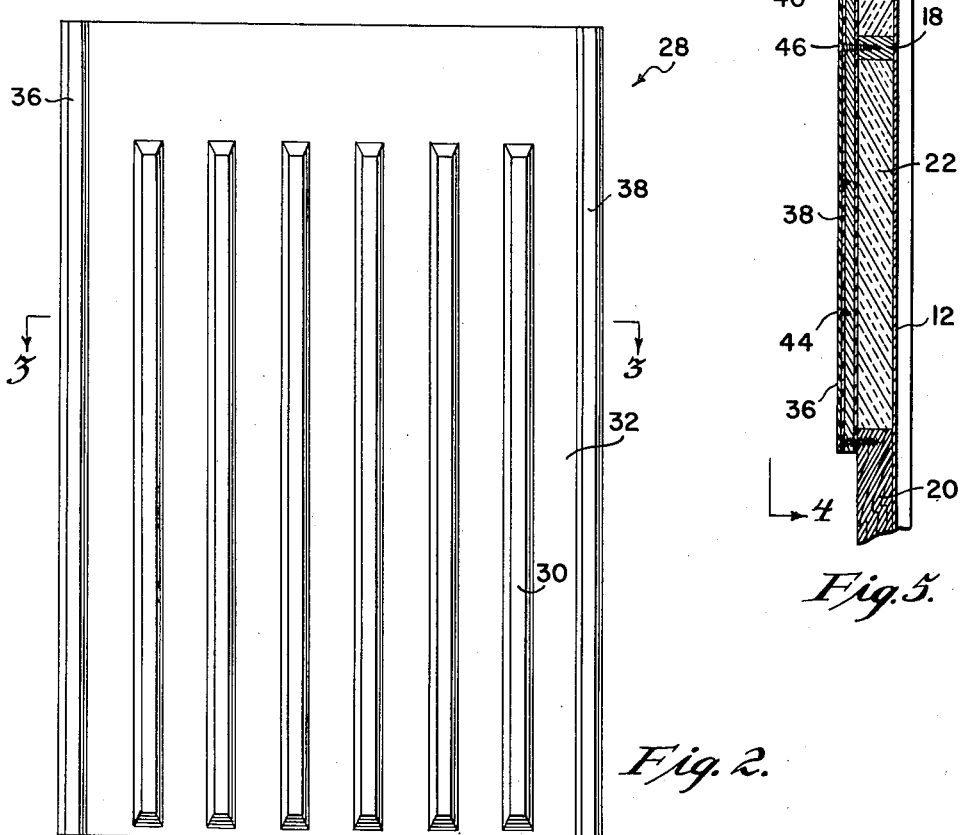
INVENTOR.
SEMOND LEVITT
BY
Caesar and Rivise
ATTORNEYS.

United States Patent Office 2,791,463
Patented May 7, 1957

2,791,463

PLASTIC LINERS AND PLASTIC CEILING LINER FOR TRAILERS

Semond Levitt, Philadelphia, Pa., assignor, by mesne assignments, to Fruehauf Trailer Company, Detroit, Mich., a corporation of Michigan Application November 30, 1953, Serial No. 395,033

5 Claims. (Cl. 296—28)

This invention relates to reinforced plastic liners for the sides of an insulated trailer alone or in combination with a reinforced plastic ceiling for the roof of the trailer.

Heretofore, insulated or refrigerated trailers were lined with plywood, light gage metals or combinations of both. Plywood continually absorbs the liquids and odors of the load, becomes rotten, cannot be steam cleaned and is easily broken through, resulting in due course in heat loss and structural failure. Thin gage metals, such as aluminum or stainless steel, are easily dented. Sheets of thin gage metal are also difficult to seal against moisture at their joints. Aluminum possesses the additional disadvantage of turning certain food commodities, such as meat, black. Moreover, metallic liners, while they do not absorb liquids and odors from the load, nevertheless rot due to rusting, electrolysis or contact with corrosive chemicals and other materials, resulting eventually, as in the case of plywood, in heat loss and structural failure.

It is the primary object of the present invention to overcome the above-mentioned disadvantages by providing liners for insulated or refrigerated trailers which are fabricated of interconnected preformed sections of a reinforced plastic.

Another object of the invention is to provide reinforced plastic liners for refrigerated trailers which are themselves heat insulators. This plus the fact that the liner sections are joined to each other and to the sides of the trailer without metal to metal contact reduces refrigeration losses.

A further object of the invention is to provide reinforced plastic liners for refrigerated trailers which are non-warping, moisture impervious, corrosion resistant and do not absorb odors. Hence they can be readily and effectively cleaned with sprays of hot water or steam.

Another object of the invention is to provide reinforced plastic liners for refrigerated trailers in which each liner section is provided with vertical corrugations or hollow ribs to allow for proper circulation of refrigerated air. These ribs plus the fact that the plastic is reinforced, preferably with fibrous glass, imparts an impact strength to the liners many times in excess of that of plywood or light gage metals, this notwithstanding the fact that the reinforced plastic liners are considerably lighter in weight than plywood or light gage metals.

Another object of the invention is to provide a refrigerated trailer with preformed reinforced plastic liners which possess a longer life, require less time and effort in assembly and less maintenance and repair than the conventional refrigerated trailers made with plywood or metallic liners.

And yet another object of the invention is to provide a refrigerated trailer body in which each entire side liner and/or ceiling liner may be molded in one piece of a reinforced plastic.

These and other objects of the invention will become more apparent as the following description proceeds in conjunction with the accompanying drawings, wherein:

Figure 1 is a perspective view of a trailer incorporating the reinforced plastic liners and ceiling of the present invention;

Figure 2 is an elevational view of the inner face of a liner section;

Figure 3 is a sectional view taken on the line 3—3 of Figure 2;

Figure 4 is a sectional view taken on the line 4—4 of Figure 5;

Figure 5 is a sectional view taken on the line 5—5 of Figure 4;

Figure 6 is an enlarged sectional view taken on the line 6—6 of Figure 4; and

Figure 7 is an enlarged sectional view taken on the line 7—7 of Figure 4.

Specific reference will now be made to the drawings wherein similar reference characters are used for corresponding elements throughout.

In its broadest aspect this invention comprises a trailer body having side liners alone or in combination with a roof ceiling each of which is molded in one piece of a reinforced plastic. Preferably, the liners and/or roof ceiling are constructed of interconnected preformed sections or panels of a reinforced plastic.

Any plastic having the desired characteristics of strength, light weight, moisture and corrosion resistance can be used when reinforced with fibrous materials such as fibrous glass, nylon, rayon, asbestos, cotton, sisal, etc. Because fibrous glass is the strongest, most uniform and least hygroscopic fiber, it is preferred.

The liner sections molded from the reinforced plastic are generally 49 by 74 inches and 0.080 inch thick. The ceiling sections are of comparable dimensions. To avoid excessive expense in providing molding equipment for forms of such relatively large dimensions, the plastic employed should be a low pressure plastic. It has been found that polyester resins are preferred. These are light-colored liquid resins of unsaturated polyesters in monomeric styrene which can be set at low pressure by the use of heat and/or catalyst to form solid infusible masses. Examples of such polyester resins are those known as "Paraplex 'P' Series Resins" and "Vibrin" resins.

The liquid polyester resins are molded with the fibrous reinforcement materials in a conventional manner. When fibrous glass is the reinforcing material, mats thereof are used in which either a low solubility or high solubility powdered polyester resin binder is incorporated, such as the "Fiberglas" mats (L. S. & H. S. binders).

Because the above reinforced plastics are heat insulators, they are particularly adapted for use as liners in refrigerated trailers as illustrated in the drawings.

The trailer, indicated at 10, comprises among other things sides having outer metallic or plastic skins 12, preferably with vertical posts 14, and a metallic or plastic skin joining the upper ends of the sides and forming a roof 16. Appropriately secured to the sides at their inner faces are vertically spaced, horizontally extending wooden boards 18 and additional wooden boards 20 extending to the trailer floor. Suitable insulation 22, such as matted fibrous glass, is positioned against the side skins 12 between the boards 18. Similarly, the roof carries longitudinally extending, transversely spaced beams 24 between which are positioned slabs of insulating material 26 such as matted fibrous glass.

The side liners are made of substantially rectangular preformed interconnected sections 28 of the reinforced plastic. To render each section impact resistant and to allow for free circulation of refrigerated air around cargo adjacent the liner, each section is corrugated in central horizontal cross-section, as shown in Figure 3. The corrugated cross-section results from the provision of vertically extending, longitudinally spaced hollow ribs 30 which bulge outwardly from the inner face 32 of the section. It is preferred that the outer surfaces 34 be flat and lie in a common plane to improve the impact resistance of the section and to avoid the provision of sharp or pointed protuberances in the interior of the trailer.

One vertical side or edge of each liner section is provided with an open vertical hollow rib 36 which is as wide or deep as the vertical hollow ribs 30. The opposite vertical side or edge of the section is provided with a closed hollow rib 38 which is narrower than the ribs 30 and 36 by an amount substantially equal to the thickness of the section. Molded together with the section as an insert in the closed hollow rib 38 is a wooden post 40.

Each side liner section is preformed by molding into the desired size and configuration. It is positioned against the insulating material 22 in the manner shown in Figures 1, 4 and 7. An adjacent liner section is assembled on the first section with its open end rib 36 overlapping the closed hollow post-carrying rib 38 of the first section as shown clearly in Figure 6. Any suitable watertight sealer 42 may be interposed between the overlapping ribs to effect a tight moisture-proof seal. A preferred sealer is an aluminum base elastic compound sold under the trademark "Alumilastic." The adjacent sections are secured to each other by suitable securing means such as screws 44 which extend through the overlapped ribs and sealer and into the post 40.

The interconnected plastic liner sections are secured to the sides of the trailer by securing means such as long screws 46 which extend through the overlapped ribs, the sealer, the post 40 and into the horizontal side beams 18, as shown clearly in Figure 5.

Because the post-carrying rib 38 is narrower than the open rib 36 by an amount substantially equal to the thickness of the section, the outer surfaces of the ribs bulging out of the inner surface of the interconnected liners will all lie in a common substantially flat plane at the interior of the trailer.

The ceiling strips 48 are sheets of the reinforced plastic which preferably run transversely of the trailer. The ceiling strips are preferably overlapped with offsets as at 50 and secured to each other by suitable securing means, such as screws 52. The strips are positioned against the roof insulating material 24, and secured to the roof by means of screws 54 extending through the strips and into the longitudinal roof posts 24. Plastic molding 56, preferably ¼ round, may be secured around the margin of the ceiling where it meets the upper edges of the side liners.

While a preferred embodiment of the invention has been shown and described hereabove, it will be understood that minor variations may be made without departing from the spirit of the invention and the scope of the appended claims.

I claim:

1. In a trailer body having sides and liners secured to the sides, said liners being constructed of interconnected preformed sections of a reinforced plastic, each liner section being substantially rectangular, one side including and open vertical rib at its inner face while the opposite side includes a vertical hollow rib at its inner face narrower than said open vertical rib and a post in said hollow rib, the open vertical rib of one liner section embracing and being secured to the hollow post-carrying rib of an adjacent section.

2. In a trailer body having sides, substantially rectangular liners constructed of interconnected preformed sections of a reinforced plastic, each section having spaced vertically extending hollow ribs at its inner face, an open vertical rib at one side of said section, a closed vertical hollow rib at the opposite side of said section, a post in said closed hollow rib, the open vertical rib of one section overlapping the closed post-carrying rib of an adjacent section, means joining the overlapped ribs to each other and means securing the overlapped ribs to the sides of the trailer.

3. The combination of claim 2 wherein said closed hollow rib is narrower than said open rib by an amount substantially equal to the thickness of the liner section and the open rib and hollow ribs are all of the same width so that the outer surfaces of said ribs lie in a common plane.

4. In a refrigerated trailer having sides and heat insulating material positioned thereagainst, substantially rectangular liners constructed of interconnected preformed sections of a reinforced plastic and covering said heat insulating material, each section being corrugated in transverse cross-section and having spaced vertically extending hollow ribs at its inner face, comprising an open vertical rib at one vertical edge of said section and a closed vertical hollow rib at the opposite vertical edge of said section, a post in said closed hollow rib, the open vertical rib of one section overlapping the closed post-carrying rib of an adjacent section, means joining the overlapped ribs to each other and means securing the overlapped ribs to the sides of the trailer.

5. In a refrigerated trailer having sides, spaced horizontal members secured to said sides and heat insulating material positioned against said sides between said horizontal members, substantially rectangular liners of uniform thickness constructed of interconnected preformed sections of a reinforced plastic covering said heat insulating material, each section being corrugated in transverse cross-section and having spaced vertically extending hollow ribs at its inner face comprising an open vertical rib at one vertical edge of said section and a closed vertical hollow rib at the opposite vertical edge of said section, a post in said closed hollow rib, the open vertical rib of one section overlapping the closed post-carrying rib of an adjacent section, the closed post-carrying rib being narrower than the open rib by an amount substantially equal to the thickness of the liner means joining the overlapped ribs to each other, and means securing the overlapped ribs to the spaced horizontal members of the sides of the trailer.

References Cited in the file of this patent

UNITED STATES PATENTS

| 1,814,556 | Jewett | July 14, 1931 |
| 2,085,923 | Murphy | July 6, 1937 |
| 2,356,008 | Schafer | Aug. 15, 1944 |
| 2,459,765 | Black | Jan. 18, 1949 |

FOREIGN PATENTS

| 710,468 | Germany | Sept. 13, 1941 |
| 546,686 | Great Britain | July 27, 1942 |
| 686,163 | Great Britain | Jan. 21, 1953 |
| 454,268 | Italy | Jan. 14, 1950 |

OTHER REFERENCES

"Automotive advancements in plastics," in "Automotive Industries" magazine, vol. 107, issue 11, Dec. 1, 1952, pgs. 70–72 and 96.

"Glass fiber insulation," in "Scientific American," of November 1944, pg. 218.

"Plastic liner cuts reefer trailer weight," in "Commercial Car Journal," July 1953, pgs. 96, 130, 131.

"Plastics body construction," in "Automobile Engineer," of June 1952, vol. 42, issue 554, pgs. 223–229.